United States Patent
Andrews et al.

(10) Patent No.: US 10,021,841 B2
(45) Date of Patent: Jul. 17, 2018

(54) LOCAL AND INTEGRATED REMOTE CONTROL SYSTEM AND METHOD FOR RETROFITTING EXISTING ELECTRIC CENTER IRRIGATION PIVOTS

(71) Applicant: LINDSAY CORPORATION, Omaha, NE (US)

(72) Inventors: Reece Robert Andrews, Arlington, NE (US); Daniel James Pickerill, Milford, NE (US)

(73) Assignee: Lindsay Corporation, Omaha, NE (US)

( * ) Notice: Subject to any disclaimer, the term of this patent is extended or adjusted under 35 U.S.C. 154(b) by 383 days.

(21) Appl. No.: 14/839,547

(22) Filed: Aug. 28, 2015

(65) Prior Publication Data
US 2017/0055467 A1 Mar. 2, 2017

(51) Int. Cl.
*G05D 9/12* (2006.01)
*A01G 25/09* (2006.01)
*G01S 19/13* (2010.01)
*G05B 15/02* (2006.01)

(52) U.S. Cl.
CPC ............ *A01G 25/092* (2013.01); *G01S 19/13* (2013.01); *G05B 15/02* (2013.01); *G05D 9/12* (2013.01); *G05B 2219/2625* (2013.01)

(58) Field of Classification Search
CPC .................................. G05D 9/12; A01G 25/16
USPC ................................................. 700/284, 281
See application file for complete search history.

(56) References Cited

U.S. PATENT DOCUMENTS

| 4,073,309 | A |   | 2/1978  | Fraser et al.               |
|-----------|---|---|---------|-----------------------------|
| 4,626,984 | A | * | 12/1986 | Unruh ............... A01G 25/16 239/69 |
| 5,927,603 | A | * | 7/1999  | McNabb ............ A01G 25/167 239/63 |
| 6,240,336 | B1| * | 5/2001  | Brundisini ......... G05B 19/0426 239/436 |
| 6,254,018 | B1| * | 7/2001  | Ostrom .............. A01G 25/092 239/69 |
| 6,259,955 | B1| * | 7/2001  | Brundisini ......... G05B 19/0426 239/69 |

(Continued)

FOREIGN PATENT DOCUMENTS

WO   WO03081362 A1   10/2003

*Primary Examiner* — Michael Tran
(74) *Attorney, Agent, or Firm* — Hovey Williams LLP

(57) ABSTRACT

A system and method for retrofitting an electric center irrigation pivot to have a standardized user interface and remote control functionality. A local control element having a standardized local user interface is installed at a pivoting point of the pivot by bypassing an existing control logic of an original control system while using an existing transformer of the original control system. A remote control element having a standardized remote user interface is also installed at the pivoting point of the pivot, and is functionally integrated with the local control element. A position-determining element is mounted on a movable portion of the electric pivot. Retrofitting multiple pivots provides each with the same standardized user interfaces. Because existing elements of the original control system are either bypassed or used, uninstalling the system and reverting to the original control system can be quickly and easily accomplished.

20 Claims, 6 Drawing Sheets

(56) References Cited

U.S. PATENT DOCUMENTS

| | | | | |
|---|---|---|---|---|
| 6,314,340 B1* | 11/2001 | Mecham | A01G 25/167 | 239/69 |
| 6,600,971 B1* | 7/2003 | Smith | G05B 15/02 | 700/17 |
| 7,412,303 B1* | 8/2008 | Porter | A01G 25/167 | 239/69 |
| 7,461,798 B1* | 12/2008 | Malsam | A01G 25/092 | 239/63 |
| 7,567,858 B1* | 7/2009 | Dunlap | A01G 25/092 | 239/67 |
| 7,880,612 B2* | 2/2011 | Caswell | G08B 13/1409 | 256/10 |
| 7,953,550 B1* | 5/2011 | Weiting | A01G 25/092 | 239/727 |
| 8,924,101 B1* | 12/2014 | Schiltz | G05B 15/02 | 417/44.2 |
| 9,149,012 B1* | 10/2015 | Sorensen | A01G 25/092 | |
| 2002/0105437 A1* | 8/2002 | Pollak | A01G 25/092 | 340/870.28 |
| 2003/0120393 A1* | 6/2003 | Bailey | A01G 25/16 | 700/284 |
| 2003/0183018 A1* | 10/2003 | Addink | A01G 25/16 | 73/861.69 |
| 2004/0015270 A1* | 1/2004 | Addink | A01G 25/16 | 700/284 |
| 2004/0039489 A1* | 2/2004 | Moore | A01G 25/16 | 700/284 |
| 2007/0043480 A1* | 2/2007 | Hergert | H02J 3/14 | 700/295 |
| 2008/0046131 A1* | 2/2008 | Sarver | G05B 19/0423 | 700/284 |
| 2011/0090334 A1* | 4/2011 | Hicks, III | G08B 13/19656 | 348/143 |
| 2011/0101135 A1* | 5/2011 | Korus | B62D 55/04 | 239/723 |
| 2011/0304222 A1* | 12/2011 | Pickerill | A01G 25/092 | 307/112 |
| 2011/0309171 A1* | 12/2011 | McConnell | A01G 25/09 | 239/726 |
| 2013/0060389 A1* | 3/2013 | Marsters | A01G 25/16 | 700/284 |
| 2013/0211717 A1* | 8/2013 | Abts | A01G 25/16 | 701/485 |
| 2013/0308675 A1* | 11/2013 | Sneed | G01N 25/00 | 374/121 |
| 2015/0032272 A1* | 1/2015 | Neesen | G06F 3/0484 | 700/284 |
| 2015/0040473 A1* | 2/2015 | Lankford | A01G 25/16 | 47/58.1 SC |
| 2015/0060580 A1* | 3/2015 | Welch | A01G 25/092 | 239/729 |
| 2015/0123060 A1* | 5/2015 | Gross | A01K 3/005 | 256/10 |
| 2015/0134129 A1* | 5/2015 | Kidder | A01G 25/16 | 700/284 |
| 2016/0106046 A1* | 4/2016 | Lennard | A01G 25/092 | 239/1 |
| 2016/0378086 A1* | 12/2016 | Plymill | G08B 13/18 | 700/284 |
| 2017/0164569 A1* | 6/2017 | Andrews | A01G 25/092 | |
| 2017/0172078 A1* | 6/2017 | Gonzalez Hernandez | A01G 25/16 | |

* cited by examiner

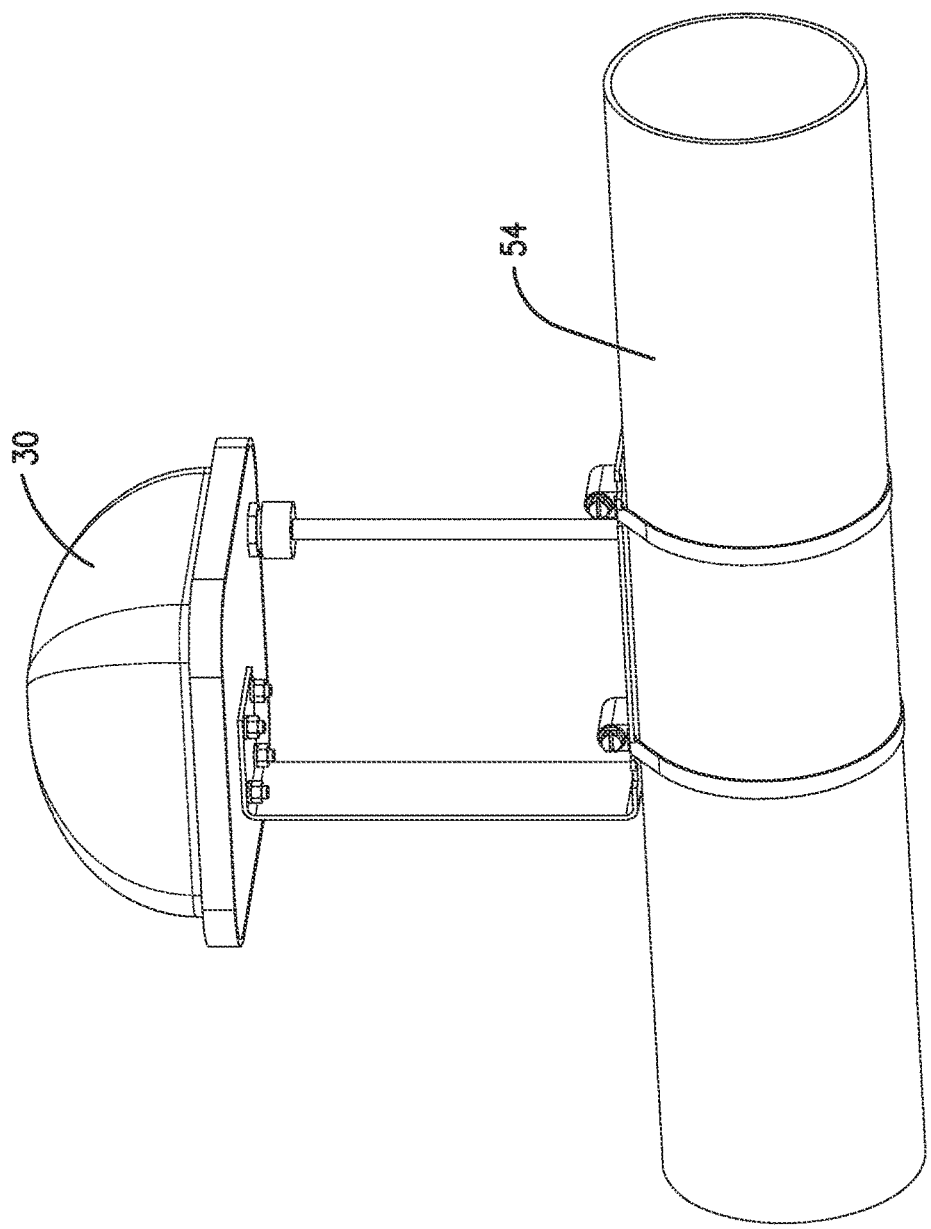

LOCAL AND INTEGRATED REMOTE CONTROL SYSTEM AND METHOD FOR RETROFITTING EXISTING ELECTRIC CENTER IRRIGATION PIVOTS

FIELD

The present invention relates to systems and methods for controlling the irrigation of fields. More specifically, the present invention concerns a system and method for retrofitting an existing electric center irrigation pivot to have both a standardized local control and a functionally integrated remote control.

BACKGROUND

Electric center irrigation pivots typically have original local controls located on main panels at the pivoting ends of the pivots. A lack of standardization of these controls across different manufacturers of such pivots means that users must be trained to use a variety of different controls and may still become confused and make potentially costly mistakes.

Some such pivots do not include original remote controls. When remote controls are desired, one solution is to entirely replace the original control systems, but this can be prohibitively expensive. Another solution is to install after-market remote controls, but this can pose other problems. Aftermarket remote controls are often installed on the opposite ends of the pivot from the original local controls so that its internal global positioning system (GPS) or other position-determining functionalities can better determine the operating positions of the pivots. This means that the pivots have to be continuously electrified along substantially their entire lengths, even when otherwise seemingly offline, to enable remote starting because electricity is needed to power the cellular or other communication systems on which the aftermarket remote controls rely to receive the remote start commands and because electricity is needed to communicate the received remote start commands from the remote controls to the original local controls at the opposite ends of the pivots. Such continuous electrification of the pivot can pose a safety concern, especially for those working on or around them without knowing about the electrical danger.

Furthermore, aftermarket remote controls are not fully integrated with the original local controls, such that commands relayed from the remote controls to the original local controls may be implemented relatively rather than absolutely. For example, if the remote control sets the pivot speed to 25%, and the original local control is set to 100%, then the resulting speed is the expected 25%. However, if the original local control is set to 25%, the unexpected resulting speed could be 25% of 25%, or 6.25%, which is equivalent to applying 4" of water when only 1" was desired.

Additionally, some aftermarket remote controls attempt to control the pivot systems by "interacting" electrically with them, but this does not always work effectively and the original local controls and the aftermarket remote controls may conflict over control of the pivots, which can cause undesirable operational run statuses and perhaps even override safeties and damage equipment and crops.

This background discussion is intended to provide information related to the present invention which is not necessarily prior art.

SUMMARY

Embodiments of the present invention solve the above-described and other problems and limitations by providing a system and method for retrofitting an existing electric center irrigation pivot to have both a standardized local control and a functionally integrated remote control. Both the local and remote controls may be located at the pivoting end of the pivot, and the system may bypass a control logic but make use of other existing components of an original control system. Because existing components of the original control system are either bypassed or used, uninstalling the system and reverting to the original control system can be quickly and easily accomplished.

An embodiment of the system for controlling an electric center irrigation pivot may broadly comprise a local control element, a remote control element, and a position-determining element. The pivot may include an original control system having an existing control logic. The local control element may facilitate a user locally controlling the operations of the pivot. The local control element may be installed at a pivoting point of the pivot by bypassing the existing control logic of the original control system. The remote control element may facilitate the user remotely controlling the operations of the pivot. The remote control element may also be installed at the pivoting point of the pivot, and may be functionally integrated with the local control element such that a change made via the remote control element is reflected in the local control element. The position-determining element may be mounted on a movable portion of the electric pivot and configured to determine and report a position to the local and remote control elements.

Various implementations of this embodiment may include any one or more of the following additional features. The local control element may include a standardized local user interface which may include a plurality of selectable icons corresponding to the operations of the pivot. The remote control element may include a standardized remote user interface which may be configured to operate on a mobile electronic device. The local control element may also use existing forward and reverse contactors, an existing field wiring terminal block, and/or an existing disconnect element of the original control system. The positioning-determining element may use global positioning system technology to determine the position. The system may be configured to allow the user to control the operations of the pivot differently across 360 sectors.

The system may be expanded to include a plurality of local control elements, remote control elements, and positioning determining elements installed on a plurality of pivots. In particular, each local control element may facilitate the user locally controlling the operations of a respective pivot, and may include a standardized local user interface such that all of the retrofitted pivots are provided with the standardized local control interface. Each remote control element may facilitate the user remotely controlling the operations of a respective pivot, and may include a standardized remote user interface which is configured to operate on a mobile electronic device. Each position-determining element may determine and report the position to the respective local and remote control elements.

An embodiment of the method for retrofitting an electric center irrigation pivot to have a standardized user interface and remote control functionality may include the following. The pivot may include an original control system having an existing control logic. A local control element may be installed and configured to facilitate a user locally controlling the operations of the pivot. The local control element may be installed at a pivoting point of the pivot by bypassing the existing control logic of the original control system. The local control element may have a standardized local user interface. The remote control element may be installed configured to facilitate the user remotely controlling the operations of the pivot. The remote control element may also be installed at the pivoting point of the pivot. The remote control element may be functionally integrated with the local control element such that a change made via the remote control element is reflected in the local control element. The position-determining element may be mounted on a movable portion of the electric pivot and configured to determine and report a position to the local and remote control elements.

Various implementation of this embodiment may include any one or more of the following features. When it is desired to revert to the original control system, the local control element and the remote control element may be uninstalled and the existing control logic of the original control system may be reconnected. The local control element may include a standardized local user interface. The remote control element may include a standardized remote user interface configured to operate on a mobile electronic device. Installing the local control element may include using an existing transformer, existing forward and reverse contactors, an existing field wiring terminal block, and an existing disconnect element of the original control system. The position-determining element may use global positioning system technology to determine the position. The local and remote control elements may allow the user to control the operations of the electric center irrigation pivot differently across 360 sectors.

The method may be expanded to include installing a plurality of local control elements and remote control elements and mounting a plurality of positioning-determining elements on a plurality of pivots. In particular, each local control element may facilitate the user locally controlling the operations of a respective pivot, and each local control element may include a standardized local user interface such that all of the retrofitted pivots are provided with the standardized local control interface. Each remote control element may facilitate the user remotely controlling the operations of the respective pivot, and each remote control element may include a standardized remote user interface which is configured to operate on a mobile electronic device. Each position-determining element may determine and report the position to the respective local and remote control elements.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 5 is a perspective view of an embodiment of a positioning-determining element of the system of FIG. 1 mounted on the exemplary existing electric center irrigation pivots;

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
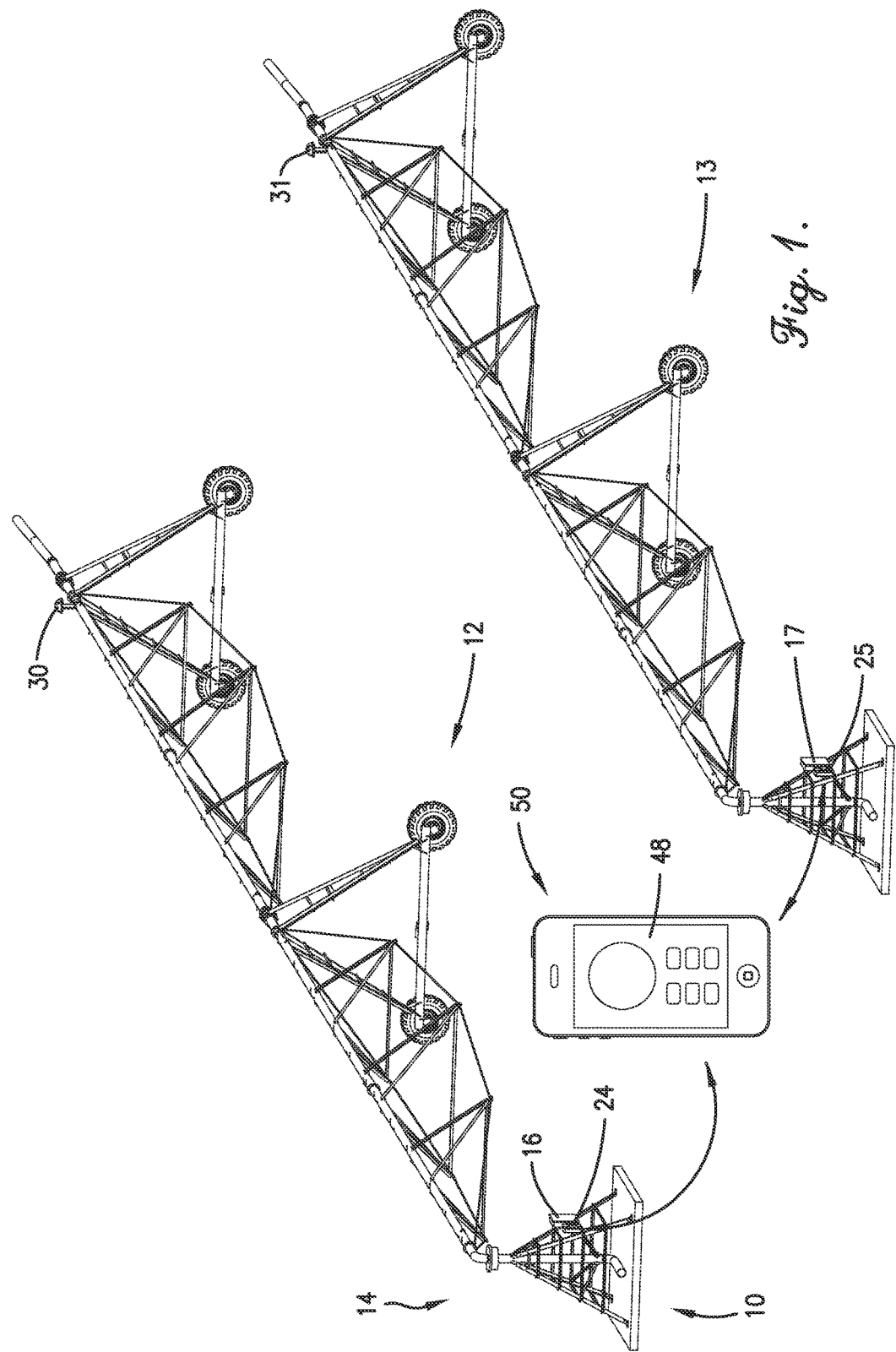
FIG. 1 is a depiction of an embodiment of the system of the present invention installed on exemplary existing electric center irrigation pivots.
Figure 2:
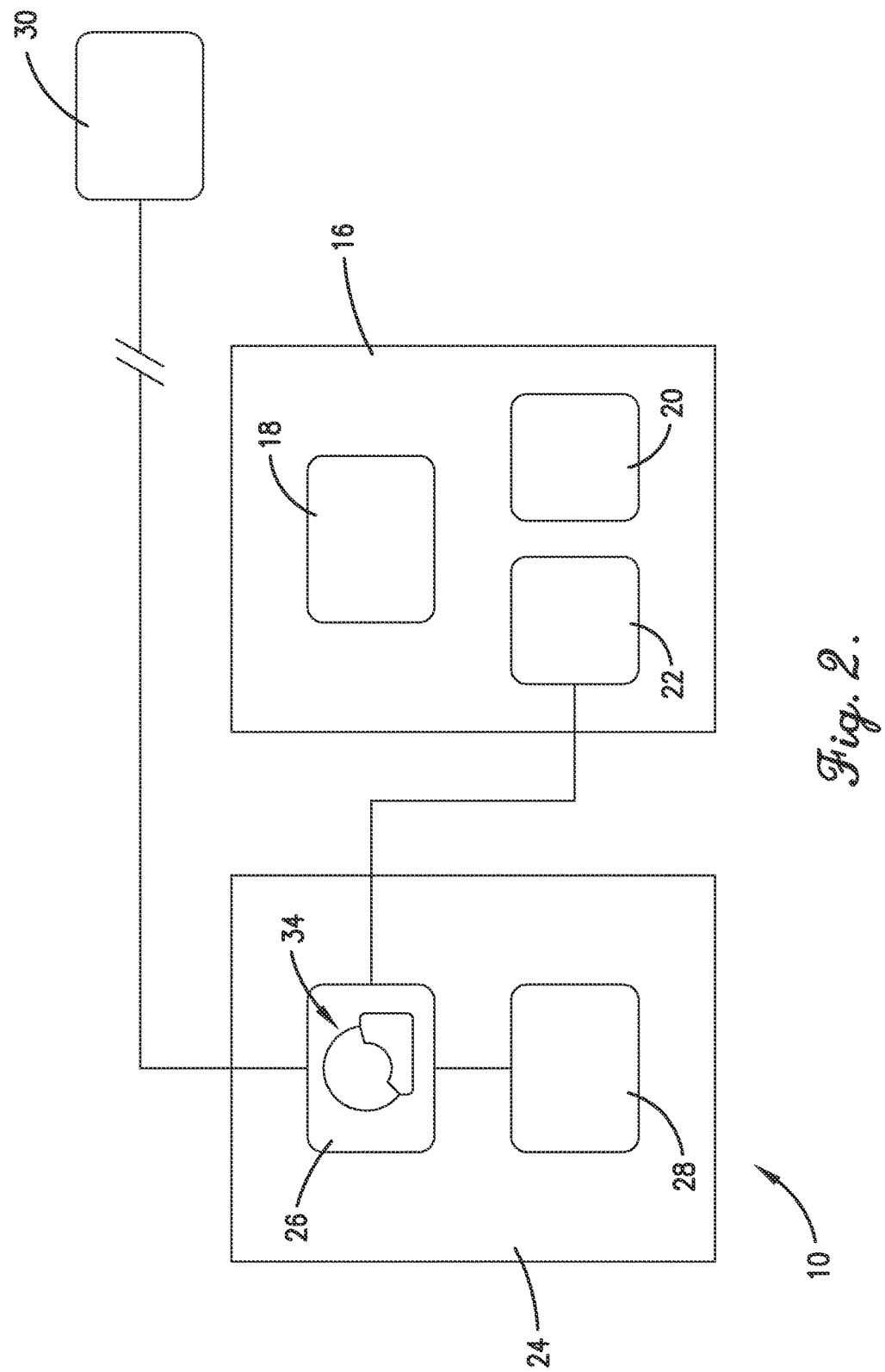
FIG. 2 is a block diagram of elements of the system of FIG. 1 and an exemplary original control system of the exemplary existing electric center irrigation pivots.

Referring to FIGS. 1 and 2, the present invention broadly provides a system 10 and method 100 for retrofitting an existing electric center irrigation pivot 12 to have both a standardized local control and a functionally integrated remote control, wherein both the local and remote controls may be located at the pivoting point 14 of the pivot 12, and wherein the system 10 may bypass the control logic of an original local control element 18 but make use of an existing transformer component 20 of the original control system 16. More specifically, the system 10 may be installed alongside the original local control element 18 and connect to existing components 22, such as forward and reverse contactors, a field wiring block, and/or a disconnect component, and the existing transformer 20 of the original control system 16, thereby transforming the original control system 16 into a junction box for the system 10 of the present invention. Thus, the present invention allows for more quickly, easily, and inexpensively retrofitting the original control systems of electric center irrigation pivots to provide standardized local and remote controls in a safer and more cost-effective manner while allowing for quickly and easily reverting to the original local control systems when desired.

Figure 4:
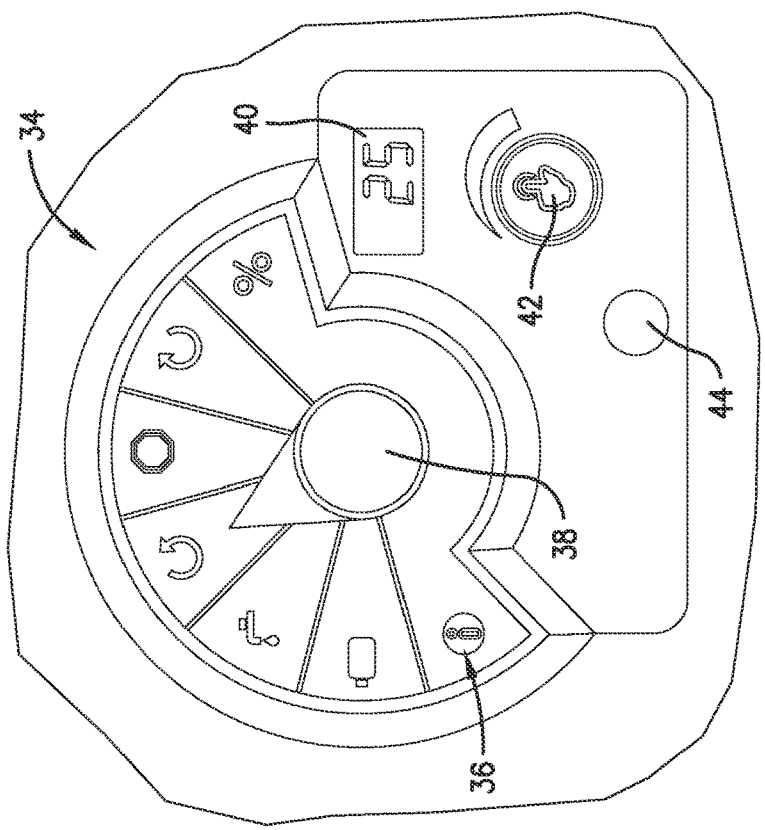
FIG. 4 is a front elevation view of an embodiment of a local user interface component of the system of FIG. 1.
Figure 3:
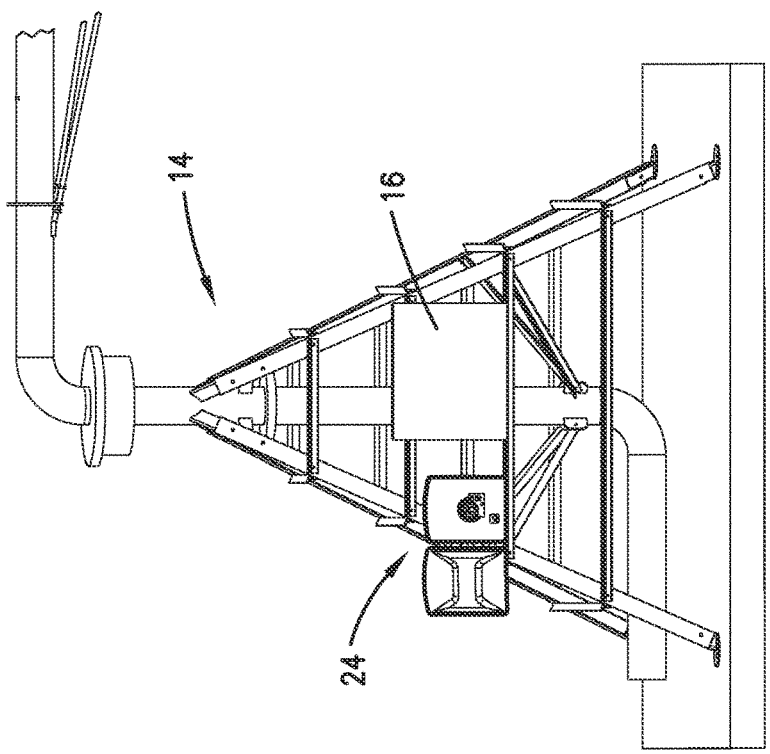
FIG. 3 is a front elevation view of a control element of the system of FIG. 1 mounted on a pivoting point of the exemplary existing electric center irrigation pivots.

An embodiment of the system 10 of the present invention may broadly comprise a control element 24, including a local control element 26 and a remote control element 28, and a position-determining (e.g., GNSS) element 30. As discussed, the control element 24 may be installed at the pivoting point 14 of the existing pivot 12, alongside the original local control element 18, and may make use of one or more components of the original control system 16, such as the existing transformer 20. Referring also to FIGS. 3 and 4, the local control element 26 may be configured to allow the user to locally control various activities, processes, or other operations associated with the pivot 12. The local control element 26 may include an easily understood and used local user interface 34. In one implementation, the local user interface 34 may include a plurality of selectable icons 36, a feature selection switch 38, a display 40, and a dial 42. The selectable icons 36 may each employ a widely recognized or otherwise intuitive symbol representing a selectable activity or process. For example, icons 36 may be provided for stop, forward, reverse, well/pump on or off control, injector on or off control, and rate (speed) and other useful activities and processes. Some or all of the icons 36 may be lightable by, e.g., LEDs to indicate their statuses. For example, the icons 36 associated with wet activities or processes may be colored blue, icons associated with dry activities or process may be colored green, and faults or alarms may be colored red; additional or alternative colors or blinking schemes may also be used to convey useful information.

The selection switch 38 may be configured to facilitate the local user selecting a particular icon from among the plurality of selectable icons 36. The selection switch 38 may take the form of a rotary switch which is turnable to select an icon. The display 40 may be configured to communicate to the local user information that is relevant to a current or selected activity or process, such as relative or absolute values and/or status codes. The display 40 may take the form of a multi-digit LED display. The dial 42 may be configured to facilitate the local user inputting information relevant to a current or selected activity or process. The dial 42 may take the form of a multi-function rotary dial having both turn and press functionality. For example, the dial 42 may be turnable to change the digits of the display, pressable to confirm a setting or selection, and pressable and holdable to select a mode (e.g., manual mode, program mode). The local control element 26 may further include a remote control element and GNSS element status indicator 44 configured to communicate to the local user whether or not an active communication link exists with these elements 28,30.

The remote control element 28 may be configured to allow the user to remotely control the various activities, processes, or other operations associated with the pivot 12 via radio, cellular, or other communication technologies. The remote control element 28 may also be located at the pivoting point 14 of the pivot 12 alongside or physically incorporated with the local control element 26. One advantage of locating the remote control element 28 at the pivoting point 14 rather than the opposite end of the pivot 12 is that it avoids the need to continuously electrify the entire length of the pivot 12 in order to receive signals and relay commands. The remote control functionality may be integrated with the local control functionality such that any change using one control is fully reflected in the other control. This avoids situations in which a change to an operation of the pivot enacted via the remote control element 28 is applied relative to the current setting of the local control element 26 rather than becoming the current setting of the local control element 26.

The remote control element 28 may include an easily understood and used remote user interface 48. The remote user interface 48 may be substantially similar to or substantially different from the local user interface 34 in appearance. The remote user interface 48 may be useable on any non-mobile or mobile computer, communication, or other electronic device 50 (e.g., a smartphone). The system 10 may also allow for substantially complete remote control and monitoring of the pivot 12 and other equipment, such as pumps, injectors, pressure sensors, flow meters, rainfall, and other devices.

Referring also to FIG. 5, the GNSS element 30 may be installed on a moveable portion of the pivot 12, such as at the opposite end of the pivot 12 from the control element 24 (e.g., on the span pipe 54 at or near the next-to-last tower panel), and wiredly or wirelessly connected to the local and remote control elements 26,28. The GNSS element 30 may be configured to determine the position of the end of the pivot using any suitable position-determining technology (e.g., GPS), and communicate it to the control elements 26,28 at the other end of the pivot. The GNSS element 30 may determine the position to an accuracy of at least approximately 0.1 of a degree.

The system 10 may further include or be configured to interface with various relevant sensors, such as pressure sensors located at one or more points on the pivot 12, temperature sensors, flow meters, and/or rainfall and rainfall amount sensors.

In one implementation, the system 10 may be configured to allow for monitoring and controlling any one or more of the following activities and processes: Start, stop, direction, water (on/off), injector (on/off), speed (% timer) to 0.1% accuracy, application depth (inches/mm), stop at position (service stop), end-guns (up to 2) with up to 10 control areas each, field position, basic variable rate irrigation (VRI) changes speed in up to 360 sectors, basic VRI control of water and chemicals in up to 360 sectors, pressure at pivot point, pressure at end of pivot, flow with meter, temperature with probe, rainfall with rain bucket, hours per revolution, programmable barrier area, water hold-time at barrier, auto-stop or auto-reverse at barrier, auto-restart after power loss, and/or pressure recovery auto-restart, history log. Furthermore, the system 10 may be configured to allow for creating, naming, and saving a limited or unlimited number of plans for the pivot 12; creating plans that run separate forward and reverse applications; configuring alerts; configuring inputs (for, e.g., chemical tanks or injectors). Additionally, the system may be configured to allow for easy access by crop advisors and for quickly and easily uploading prescriptions. Additionally, the system 10 may be configured to allow the user to locally or remotely manually align the pivot 12 when it is out of alignment. This may be accomplished by allowing the user to reverse the direction of movement of the pivot 12 until the pivot 12 is properly aligned.

The system 10 may allow for differentially controlling the activities and processes of the pivot 12 across up to 360 sectors. More specifically, each angle of rotation of the pivot 12 may represent a different sector within which the pivot 12 may be programmed to behave the same as or differently from other sectors. For example, some sectors may receive more or less water than other sectors; some sectors may receive spot treatment with chemicals while other sectors may receive no or continuous treatment; and some sectors may receive forward and reverse applications while other sectors may receive only forward applications.

Referring again to FIG. 1, the system 10 may be installed on a single pivot 12 or on a plurality of pivots 12,13. More specifically, the existing local control systems 16,17 of the plurality of pivots 12,13 may be replaced by a plurality of the control elements 24,25 and a plurality of the GNSS elements 30,31, with each being installed on a respective pivot substantially as already described. Thus, all of the plurality of pivots 12,13 may be provided with the standardized local user interface 34, and all of the pivots 12,13 may be controllable through the standardized remote user interface 48 operating on, e.g., the mobile device 50.

Figure 6:
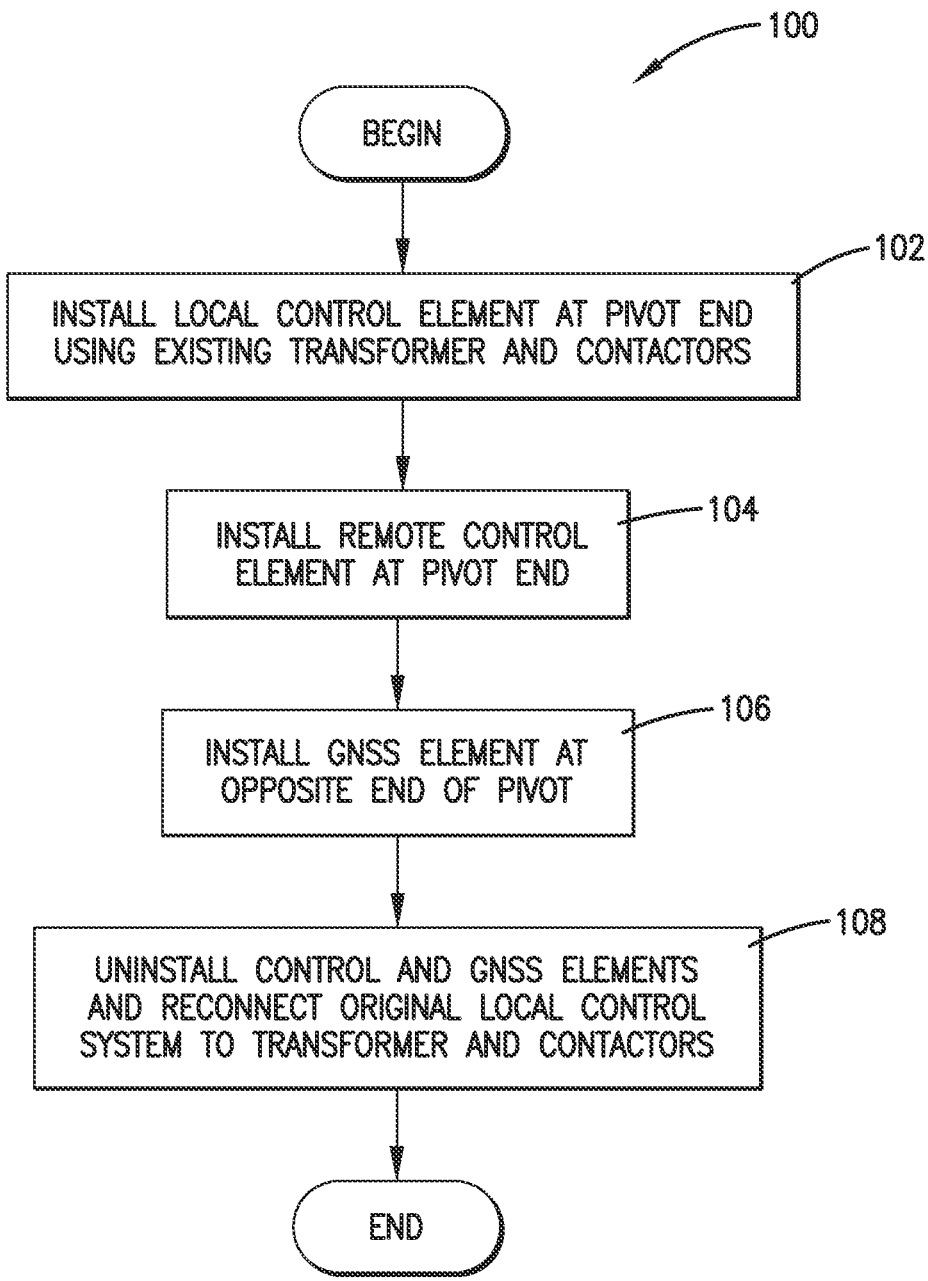
FIG. 6 is a flowchart of steps involved in an embodiment of a method of installing the system of FIG. 1 on one of the exemplary existing electric center irrigation pivots.

Referring to FIG. 6, an embodiment of the method 100 of retrofitting the existing electric center irrigation pivot 12 may broadly comprise the following steps. The pivot 12 may include the original control system 16 having the existing control logic of the original local control element 18, the existing transformer 20, and the other existing components 22. The local control element 26 may be installed at the pivoting point 14 of the pivot 12 by bypassing the existing control logic while using the existing transformer and/or other components 20,22, as shown in step 102, wherein the local control element 26 may have the standardized local user interface 34. The remote control element 28 may also be installed at the pivoting point 14 of the pivot 12, as shown in step 104, wherein the remote control element 28 may be functionally integrated with the local control element 26 such that a change made via the remote control element 28 is reflected in the local control element 26, and wherein the remote control element 28 may be configured to allow a user to remotely control and monitor operation of the pivot 12. The position-determining element 30 may be mounted on a movable portion of the pivot 12, as shown in step 106, wherein the position-determining element 30 is configured to determine and report a position to the local and remote control elements 26,28. When it is desired to remove the system 10 and revert to the original control system 16, the local and remote control and position-determining elements 26,28,30 may be uninstalled, and the original local control element 18 may be quickly and easily reconnected to the existing transformer and/or other components 20,22, as shown in step 108.

Figure 7:
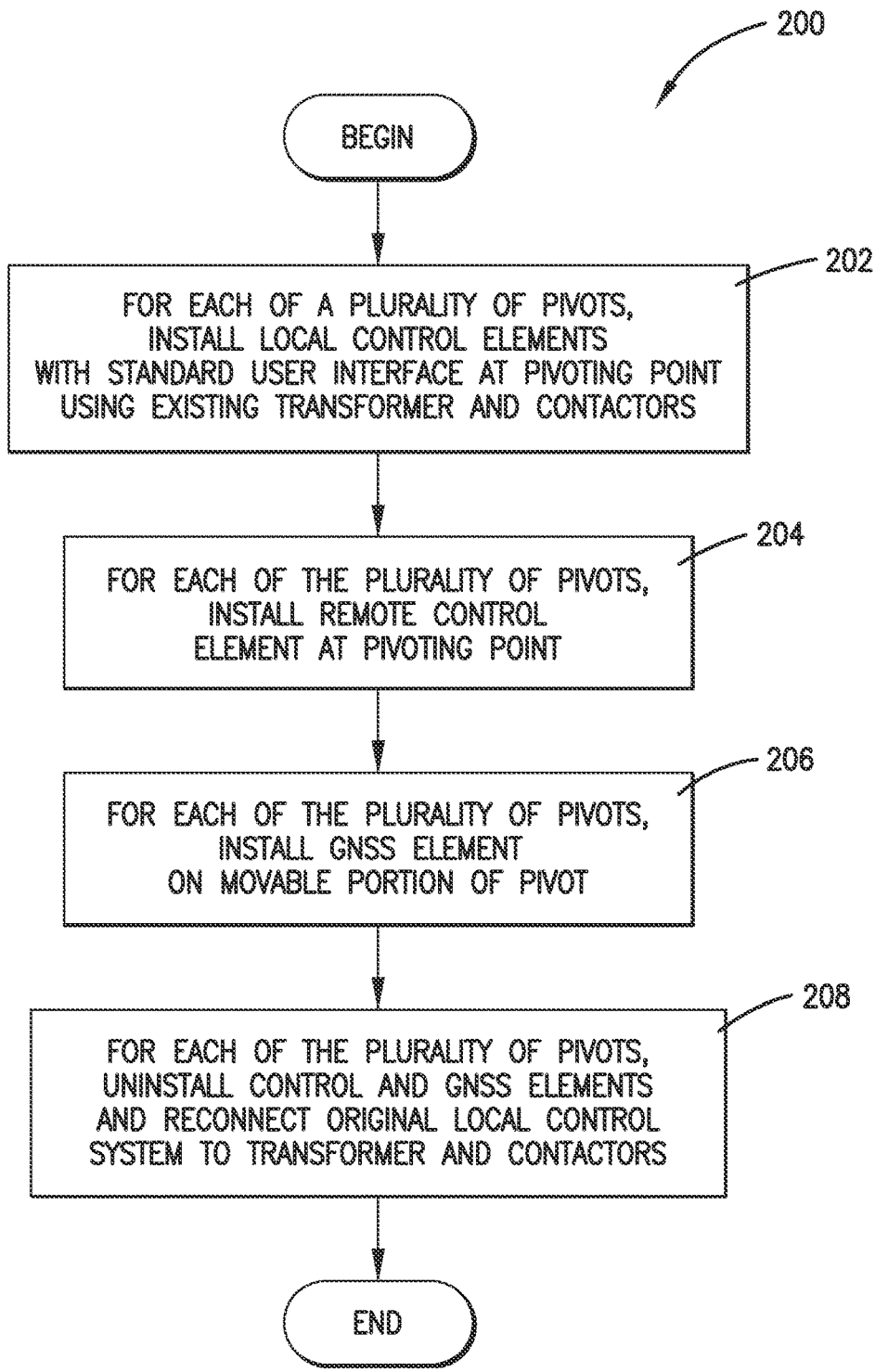
FIG. 7 is a flowchart of steps involved in an embodiment of a method of installing the system of FIG. 1 on the plurality of exemplary existing electric center irrigation pivots.

Referring also to FIG. 7, an embodiment of a method 200 of retrofitting a plurality of electric center irrigation pivots 12 may broadly comprise the following steps. Each of the pivots 12 may include the original control system 16 having the existing control logic of the original local control element 18, the existing transformer 20, and the other existing components 22. On each electric irrigation center pivot 12 the local control element 26 may be installed at the pivoting point 14 by bypassing the existing control logic while using the existing transformer and/or other components 20,22, as shown in step 202, wherein the local control element 26 may have a standardized local user interface 34 such that all of the retrofitted pivots 12,13 is provided with the standardized local user interface 34. On each pivot 12 the remote control element 28 may also be installed at the pivoting point 14 of the pivot 12, as shown in step 204, wherein the remote control element 28 is functionally integrated with the local control element 26 such that a change made via the remote control element 28 is reflected in the local control element 26, and wherein the remote control element 28 is configured to allow a user to remotely control and monitor operation of the plurality of pivots 12. On each pivot 12 the position-determining element 30 may be mounted on a movable portion of the pivot 12, as shown in step 206, wherein the position-determining element 30 is configured to determine and report a position to the respective local and remote control elements 26,28. When it is desired to remove the system 10 from one or more of the pivots 12 and revert to their original control systems 16, for each pivot 12 the local and remote control and position-determining elements 26,28,30 may be uninstalled, and the original local control element 18 may be quickly and easily reconnected to the existing transformer and/or other components 20,22, as shown in step 208.

The system and method of the present invention provide several advantages over prior art solutions. One advantage of using the existing transformer and contactors is that the system is less expensive, less complex, and more quickly and easily installed and uninstalled than if it included its own transformer and contactors. Another advantage of using the existing transformer is that the system can be installed in approximately one hour and uninstalled in even less time, which allows for removing and transferring the system whenever necessary or desirable, such as when a field is scheduled to lie fallow for a period or when a lease of a field is scheduled to expire. An advantage of the universality of the system of the present invention is that users, including growers, advisors, employees, third-party providers, and service personnel, are required to learn only the one system in order to successfully control pivots with substantially different original control systems. Another advantage of the universality is that a single remote control element, and therefore a single remote user interface may be used to monitor and control multiple pivots. Relatedly, the system is easily expandable to accommodate the subsequent addition of one or more pivots. Another significant advantage is a safer product because it is installed at the pivoting point of the pivot rather than the opposite end like many prior art products, thereby eliminating the potentially dangerous live voltage over the length of the pivot to provide power when the pivot is stopped. Another advantage of the universality of the system is that data for water use and other reports is available in a single format from multiple pivots, thereby avoiding any risk of incompatibility of data and/or data formats and making preparation of such reports much quicker and easier. Furthermore, such data and reports may be easily focused on one or more specific sectors.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for controlling an electric center irrigation pivot, wherein the electric center irrigation pivot includes an original control system having an existing local control element and an existing control logic, the system comprising:

an additional local control element configured to facilitate a user locally controlling a plurality of operations of the electric center irrigation pivot, the additional local control element being installed at a pivoting point of the electric center irrigation pivot and bypassing without removing the existing local control element and the existing control logic of the original control system;

an additional remote control element configured to facilitate the user remotely controlling the plurality of operations of the electric center irrigation pivot, the additional remote control element being installed at the pivoting point of the electric center irrigation pivot, and being functionally integrated with the additional local control element such that a change made via the additional remote control element is reflected in the additional local control element; and a position-determining element mounted on a movable portion of the electric pivot and configured to determine and report a position to the additional local and additional remote control elements.

2. The system as set forth in claim 1, wherein the additional local control element includes a standardized local user interface.

3. The system as set forth in claim 2, wherein the standardized local user interface includes a plurality of selectable icons corresponding to plurality of operations.

4. The system as set forth in claim 1, wherein the additional remote control element includes a standardized remote user interface which is configured to operate on a mobile electronic device.

5. The system as set forth in claim 1, wherein the additional local control element also uses an existing transformer, existing forward and reverse contactors, an existing field wiring terminal block, and an existing disconnect component of the original control system.

6. The system as set forth in claim 1, wherein the positioning-determining element uses global positioning system technology to determine the position.

7. The system as set forth in claim 1, wherein the system is configured to allow the user to control the plurality of operations of the electric center irrigation pivot differently across 360 sectors.

8. The system as set forth in claim 1, wherein the system allows for controlling a plurality of electric center irrigation pivots, and the system further includes—
a plurality of the additional local control element, with each additional local control element configured to facilitate the user locally controlling the plurality of operations of a respective pivot of the plurality of electric center irrigation pivots, and each additional local control element including a standardized local user interface such that the plurality of electric center irrigation pivots are all provided with the standardized local control interface;
a plurality of the additional remote control element, with each additional remote control element configured to facilitate the user remotely controlling the plurality of operations of the respective pivot of the plurality of electric center irrigation pivots, and each additional remote control element includes a standardized remote user interface which is configured to operate on a mobile electronic device; and
a plurality of the position-determining element, with each position-determining element being mounted on a movable portion of the respective pivot of the plurality of electric center irrigation pivots and configured to determine and report the position to respective additional local and additional remote control elements.

9. A method for retrofitting an electric center irrigation pivot to have a standardized local user interface and remote control functionality, wherein the electric center irrigation pivot includes an original control system having an existing local control element and an existing control logic, the method comprising the steps of:
installing an additional local control element configured to facilitate a user locally controlling a plurality of operations of the electric center irrigation pivot, the additional local control element being installed at a pivoting point of the electric center irrigation pivot by bypassing without removing the existing local control element and the existing control logic of the original control system, wherein the additional local control element has a standardized local user interface;
installing an additional remote control element configured to facilitate the user remotely controlling the plurality of operations of the electric center irrigation pivot, the additional remote control element being installed at the pivoting point of the electric center irrigation pivot, wherein the additional remote control element is functionally integrated with the additional local control element such that a change made via the additional remote control element is reflected in the additional local control element, and wherein the additional remote control element is configured to allow a user to remotely control and monitor operation of the electric center irrigation pivot; and
mounting a position-determining element on a movable portion of the electric pivot, wherein the position-determining element is configured to determine and report a position to the additional local and remote control elements.

10. The method as set forth in claim 9, further including, when it is desired to revert to the original control system, uninstalling the additional local control element and the additional remote control element and reconnecting the existing control logic of the original control system.

11. The method as set forth in claim 9, wherein the additional local control element includes a standardized local user interface.

12. The method as set forth in claim 9, wherein the additional remote control element includes a standardized remote user interface which is configured to operate on a mobile electronic device.

13. The method as set forth in claim 9, wherein installing the additional local control element includes using an existing transformer, existing forward and reverse contactors, an existing field wiring terminal block, and an existing disconnect component of the original control system.

14. The method as set forth in claim 9, wherein the positioning-determining element uses global positioning system technology to determine the position.

15. The method as set forth in claim 9, wherein the additional local and remote control elements are configured to allow the user to control the plurality of operations of the electric center irrigation pivot differently across 360 sectors.

16. The method as set forth in claim 9, further including—
installing a plurality of the additional local control element on a plurality of electric center irrigation pivots, with each additional local control element configured to facilitate the user locally controlling the plurality of operations of a respective pivot of the plurality of electric center irrigation pivots, and each additional local control element including a standardized local user interface such that the retrofitted plurality of electric center irrigation pivots are all provided with the standardized local control interface;
installing a plurality of the additional remote control element on the plurality of electric center irrigation pivots, with each additional remote control element configured to facilitate the user remotely controlling the plurality of operations of the respective pivot of the plurality of electric center irrigation pivots, and each additional remote control element includes a standardized remote user interface which is configured to operate on a mobile electronic device; and
mounting a plurality of position-determining elements on the plurality of electric irrigation center pivots, with each position-determining element being mounted on the respective pivot of the plurality of electric center irrigation pivots and configured to determine and report the position to respective additional local and remote control elements.

17. A method of retrofitting a plurality of electric center irrigation pivots to have a standardized local user interface and remote control functionality, wherein each of the electric center irrigation pivots includes an original control system having an existing local control element and an existing control logic, the method comprising the steps of:

installing on each electric irrigation center pivot an additional local control element configured to facilitate a user locally controlling a plurality of operations of a respective pivot of the plurality of electric center irrigation pivots, with each additional local control element being installed at a pivoting point of the respective pivot by bypassing without removing the existing local control element and the existing control logic of the original control system of the respective original control system, and wherein each additional local control element has a standardized local user interface such that the retrofitted plurality of electric irrigation center pivots are all provided with the standardized local user interface;

installing on each electric irrigation center pivot an additional remote control element configured to facilitate the user remotely controlling the plurality of operations of the respective pivot of the plurality of electric center irrigation pivots, with each additional remote control element being installed at the pivoting point of the respective pivot, wherein the additional remote control element is functionally integrated with the additional local control element such that a change made via the additional remote control element is reflected in the additional local control element, and wherein each additional remote control element has a standardized remote user interface such that the retrofitted plurality of electric irrigation center pivots are all provided with the standardized remote user interface; and mounting on a movable portion of each electric irrigation center pivot a position-determining element, wherein each position-determining element is configured to determine and report the position to respective additional local and remote control elements.

18. The method as set forth in claim 17, further including, when it is desired to revert to the original local control system of one or more of the plurality of electric irrigation center pivots, uninstalling from each of the one or more electric irrigation center pivots the additional local control element and the additional remote control element and reconnecting the existing control logic of the original control system.

19. The method as set forth in claim 17, wherein installing each additional local control element includes using an existing transformer, existing forward and reverse contactors, an existing field wiring terminal block, and an existing disconnect component of the respective original control system.

20. The method as set forth in claim 17, wherein the standardized remote user interface is configured to allow the user to control the plurality of operations of the plurality of electric irrigation pivots using a mobile electronic device.

* * * * *